United States Patent
Akira et al.

(10) Patent No.: US 9,430,716 B2
(45) Date of Patent: Aug. 30, 2016

(54) IMAGE PROCESSING METHOD AND IMAGE PROCESSING SYSTEM

(75) Inventors: Naoto Akira, Tokyo (JP); Atsushi Hiroike, Kawagoe (JP)

(73) Assignee: Hitachi, Ltd., Tokyo (JP)

( * ) Notice: Subject to any disclaimer, the term of this patent is extended or adjusted under 35 U.S.C. 154(b) by 1161 days.

(21) Appl. No.: 13/438,249

(22) Filed: Apr. 3, 2012

(65) Prior Publication Data

US 2012/0256947 A1    Oct. 11, 2012

(30) Foreign Application Priority Data

Apr. 7, 2011    (JP) .................................. 2011-085250

(51) Int. Cl.
| | |
|---|---|
| G06K 9/46 | (2006.01) |
| G09G 5/00 | (2006.01) |
| G06K 9/68 | (2006.01) |
| G06K 9/50 | (2006.01) |
| G06F 17/30 | (2006.01) |

(52) U.S. Cl.
CPC ........... *G06K 9/50* (2013.01); *G06F 17/30011* (2013.01); *G06F 17/30247* (2013.01); *G06F 17/30256* (2013.01)

(58) Field of Classification Search
CPC ................... G06F 17/30247; G06F 17/30256; G06F 17/30011; G06K 9/00483; G06K 9/50; G06K 9/00442; G06K 9/2054; G06K 9/2063
See application file for complete search history.

(56) References Cited

U.S. PATENT DOCUMENTS

| | | | |
|---|---|---|---|
| 5,933,823 A | * | 8/1999 | Cullen et al. |
| 2001/0014176 A1 | * | 8/2001 | Kamada et al. ............... 382/181 |
| 2006/0112142 A1 | * | 5/2006 | Sako et al. ................. 707/104.1 |

FOREIGN PATENT DOCUMENTS

| | | |
|---|---|---|
| JP | 2000-148793 A | 5/2000 |
| JP | 2006-146628 A | 6/2006 |

* cited by examiner

*Primary Examiner* — Kim Vu
*Assistant Examiner* — Michael Vanchy, Jr.
(74) *Attorney, Agent, or Firm* — Mattingly & Malur, PC

(57) ABSTRACT

An example is an image processing method including a step of acquiring data containing an image, an extraction step of extracting a first image region from the acquired data based on the type of software for generating the acquired data, an extraction step of extracting a second image region the same as or similar to each of images held in a storage unit from the acquired data by comparing the acquired data and each of the images, an extraction step of extracting a third image region the same as or similar to each of the images from the acquired data by comparing the image feature amount of the acquired data and the image feature amount of each of the images, and a step of identifying an image in the acquired data to be stored in the storage unit based on the image regions and reliabilities of the extraction steps.

10 Claims, 11 Drawing Sheets

| # | IMAGE ID | IMAGE FEATURE AMOUNT | IMAGE | DOCUMENT ID | PAGE | COORDINATE | RELIABILITY |
|---|---|---|---|---|---|---|---|
| 1 | 10000001 | (-1.4,0.6,....) | 10000001.jpg | 000001 | 1 | 35,10,60,35 | 3 |
| 2 | 10000002 | (0.8,-1.2,....) | 10000002.jpg | 000001 | 1 | 5,40,30,70 | 2 |
| 3 | 10000003 | (0.2,1.2,....) | 10000003.jpg | 000001 | 1 | 35,40,60,70 | 2 |
| 4 | 10000004 | (1.1,-0.3,....) | 10000004.jpg | 000001 | 1 | 80,40,95,70 | 0 |
| 5 | 10000005 | (-0.6,0.9,....) | 10000005.jpg | 000001 | 1 | 65,75,85,90 | 1 |
| ... | ... | ... | ... | ... | ... | ... | ... |

FIG. 2

| | 1131 | 1132 | 1133 | 1134 | 1135 | 1136 | 1137 |
|---|---|---|---|---|---|---|---|
| # | DOCUMENT ID | TYPE | DOCUMENT STRUCTURE | AUTHOR | UPDATE DATE | FILE PATH |
| 1 | 000001 | PDF | 1 | AAA | 2010/5/5 | file://xxx.xxx/... |
| 2 | 000002 | PPT | 1 | BBB | 2010/4/1 | file://xxx.xxx/... |
| 3 | 000003 | DOC | 1 | CCC | 2010/6/19 | file://yyy.xxx/... |
| 4 | 000004 | PPT | 1 | DDD | 2010/6/2 | file://xxx.xxx/... |
| 5 | 000005 | PDF | 0 | EEE | 2010/5/1 | file://yyy.xxx/... |
| ... | ... | ... | ... | ... | ... | ... |

| # | PAGE ID | IMAGE FEATURE AMOUNT | DOCUMENT ID | PAGE | IMAGE |
|---|---|---|---|---|---|
| 1 | 1000001 | (-1.4,0.6,...) | 000001 | 1 | 1000001.jpg |
| 2 | 1000002 | (0.8,-1.2,...) | 000001 | 2 | 1000002.jpg |
| 3 | 1000003 | (0.2,1.2,...) | 000001 | 3 | 1000003.jpg |
| 4 | 1000004 | (1.1,-0.3,...) | 000002 | 1 | 1000004.jpg |
| 5 | 1000005 | (-0.6,0.9,...) | 000002 | 2 | 1000005.jpg |
| ... | ... | ... | ... | ... | ... |

| # | FIRST | SECOND | THIRD | IMAGES TO BE REGISTERED | RELIABILITY |
|---|---|---|---|---|---|
| 1 | × | ○ | ○ | EMPLOY THIRD IMAGE REGIONS | 1 |
| 2 | × | × | ○ | EMPLOY THIRD IMAGE REGIONS | 1 |
| 3 | × | ○ | × | EMPLOY SECOND IMAGE REGIONS | 1 |
| 4 | ○ | ○ | ○ | EMPLOY FIRST IMAGE REGIONS | 3 |
| 5 | ○ | × | ○ | EMPLOY FIRST IMAGE REGIONS | 2 |
| 6 | ○ | ○ | × | EMPLOY FIRST IMAGE REGIONS | 2 |
| 7 | ○ | × | × | EMPLOY FIRST IMAGE REGIONS | 1 |

IMAGE PROCESSING METHOD AND IMAGE PROCESSING SYSTEM

CLAIM OF PRIORITY

The present application claims priority from Japanese patent application JP 2011-085250 filed on Apr. 7, 2011, the content of which is hereby incorporated by reference into this application.

BACKGROUND OF THE INVENTION

This invention relates to an image processing method, and more particularly, to an image processing method capable of searching for an image in a document.

The capacity of a storage has been increasing recently, and consequently a large amount of document data, which is difficult to search by means of an ordinary method, can now be accumulated in the storage. As a result, for example, the number of applications for a large amount of document data is increased by storing the document data in a storage which can be shared by respective computers, thereby enabling an organization such as a company to share information, and to use the existing document data as materials for creating a new document.

As a method for searching the document data in those applications, a method of directly referring to a folder in which files are stored, thereby referring to target document data, and a method of searching for text information containing a certain word by means of a query, thereby searching for document data containing the text information have mainly been used conventionally.

However, the search based only on the text information can narrow down the document data to a certain extent, but there has been a problem that a search result cannot be narrowed down to documents close in contents. Moreover, when a proper word is not used for the query, there has been a problem that a miss in the search occurs.

On the other hand, as cameras on cellular phones and digital cameras prevail, and an image creation function of word processing software is increasingly used, documents containing a large number of images in addition to texts, which has conventionally been a main subject of search, are increasing.

A method of individually calculating similarities using not only texts but also a document structure representing a plurality of pieces of image information in a document, and how images are structured, and searching the document using a comprehensive evaluation value obtained by the calculated similarities as a similarity in the document data, a method of displaying these documents (see, for example, Japanese Patent Application Laid-open Nos. 2000-148793 and 2006-146628), and the like are proposed.

SUMMARY OF THE INVENTION

Japanese Patent Application Laid-open Nos. 2000-148793 and 2006-146628 describe the methods for extracting the text information, the image information, the structure information, and the like by analyzing the document structure of the document data. When the conventional technology is applied to a search for document data, there has been a problem that the document data is searched with an image that is not intended by the user. Moreover, there has been a problem that it is difficult to extract the structure information from document data acquired by an image scanner device or the like.

For example, when a document is created by means of the drawing function of word processing software, a user can generate one image by combining various graphics. In this case, as a result of extraction of an image of the minimum unit by means of the document structure, an object image of a general shape such as a line or a circle, which does not have a meaning, may be extracted.

Moreover, the word processing software includes software having a function of grouping graphics into one image unit. When this word processing software is used, whether or not images are grouped depends on the user. Therefore, when the related technologies are used, there has been a problem that proper structure information representing an image meaningful to the user may not always be extracted. Moreover, there has been a problem that grouping which does not influence display and print cannot be made mandatory for a user based on the same criterion.

Further, an image is used as auxiliary information according to the related technologies, but there has been a problem that a sufficient search accuracy cannot be obtained when the search is carried out with only an image.

It is therefore an object of this invention to provide a system which enables a search for document data by extracting an image appropriate for the search from document data in which a unit of image used for the search is not clear. Moreover, it is also an object of this invention to provide a system for highly accurately searching for related document data by searching for the same or similar document data in the search with only an image in document data.

Thus, a representative example of this invention is an image processing system including a processor executing a program stored in a memory, and a storage unit for holding a plurality of images. The processor acquires data containing an image. The processor extracts, in a first extraction step, a first image region from the acquired data in accordance with a type of software used for generating the acquired data. The processor extracts, in a second extraction step, a second image region that is the same as or similar to each of the plurality of images held in the storage unit from the acquired data by comparing the acquired data and each of the plurality of images held in the storage unit The processor extracts, in a third extraction step, a third image region that is the same as or similar to each of the plurality of images held in the storage unit from the acquired data by comparing an image feature amount of the acquired data and an image feature amount of each of the plurality of images held in the storage unit The processor identifies an image in the acquired data to be stored in the storage unit based on the first image region, the second image region and the third image region, and reliabilities set to the first extraction step, the second extraction step and the third extraction step.

According to the exemplary embodiment of this invention, an image appropriate for a search can be extracted from document data in which a unit of image is not clear.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 2 is an explanatory diagram illustrating an image data DB according to the embodiment of this invention.

FIG. 3 is an explanatory diagram illustrating a document data DB according to the embodiment of this invention.

DETAILED DESCRIPTION OF THE PREFERRED EMBODIMENT

According to an embodiment of this invention, a document search device extracts images contained in document data from the document data by means of a plurality of methods, and selects an image based on the extracted images and reliabilities. As a result, an image proper for a search is identified. Then, when document data is searched, a more accurate search is realized by comparing the images accumulated in the document search device and an image contained in the document data with each other by accumulating the identified image in the document search device.

A description is now given of the embodiment of this invention referring to drawings.

Figure 1:
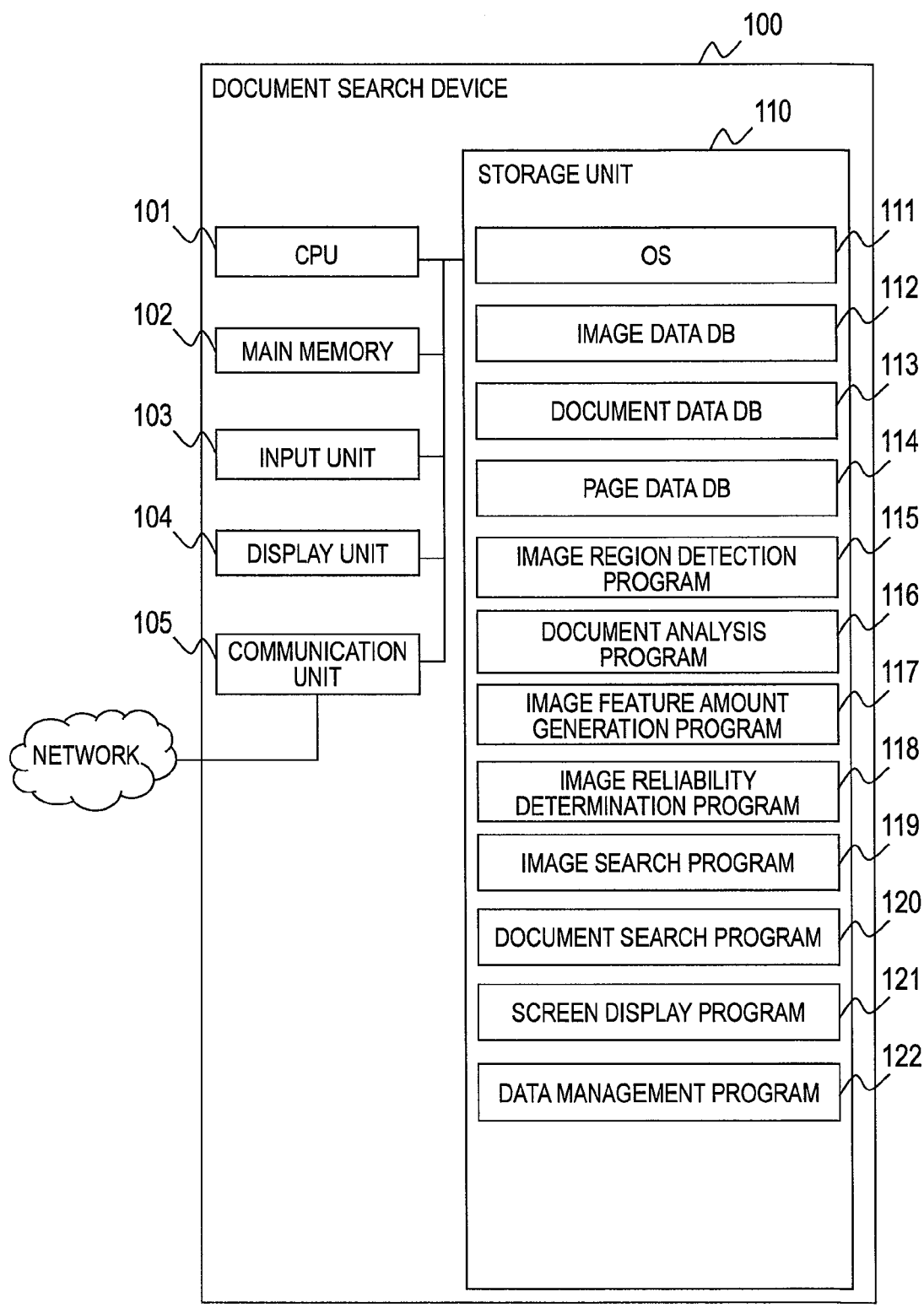
FIG. 1 is a block diagram illustrating a physical configuration of a document search device according to an embodiment of this invention.

FIG. 1 is a block diagram illustrating a physical configuration of the document search device 100 according to the embodiment of this invention.

The document search device 100 according to this embodiment includes a processor 101, a main memory 102, an input unit 103, a display unit 104, a communication unit 105, and a storage unit 110. The document search device 100 illustrated in FIG. 1 is implemented by one terminal, but the document search device 100 according to this embodiment may be implemented by a plurality of computers, or may be implemented by a virtual server. Moreover, the storage unit 110 according to this embodiment may be a virtual storage device implemented by a plurality of storage devices. Therefore, the document search device 100 according to this embodiment may be a document search system implemented by a plurality of computers and a plurality of storage devices.

The processor 101 is a processing device for reading each of functions stored in the storage unit 110 into the main memory 102, and carrying out each of the read functions. The processor 101 may include at least one processor, and each processor 101 may be a central processing unit (CPU).

The main memory 102 is a storage volume for temporarily storing programs and the like. The input unit 103 is an input device used by a user or the like for inputting document data into the document search device 100. The input unit 103 is an input device such as a keyboard, a mouse, or a USB driver.

The display unit 104 is a device for displaying a search result of document data to the user or the like. The display unit 104 is an output device such as a display or a printer. The communication unit 105 is a device for coupling the document search device 100 directly or via a network to another device. The communication unit 105 is a device such as a network interface.

The storage unit 110 is a storage device for storing programs, data, and the like for implementing the functions of the document search device 100. The storage unit 110 is an auxiliary storage device such as a hard disk drive.

The storage unit 110 holds an operating system (OS) 111, an image data DB 112, a document data DB 113, a page data DB 114, an image region detection program 115, a document analysis program 116, an image feature amount generation program 117, an image reliability determination program 118, an image search program 119, a document search program 120, a screen display program 121, and a data management program 122.

The OS 111 is a basic function for controlling the document search device 100 to operate.

The image data DB 112 is a database containing information on images out of document data of comparison destination held by the document search device 100.

It should be noted that document data input to the document search device 100, and serves as keys for the search is described as document data of comparison source according to this embodiment. Moreover, document data which is input to the document search device 100, and from which images appropriate for the search are extracted is also described as document data of comparison source. In contrast, a set of document data which is stored in the storage unit 110 to be compared with the document data of comparison source is described as document data of comparison destination.

The document data of comparison source according to this embodiment contains at least one page. Moreover, document data described below contains at least one image, but this embodiment may be applied to document data which does not contain an image.

The document data of comparison destination according to this embodiment is a set of a plurality of pieces of document data containing texts or images. The document data of comparison destination according to this embodiment is accumulated in the storage unit 110, but the document data of comparison destination may be stored in another storage device coupled to the document search device 100.

The document data DB 113 is a database containing information on the document data of comparison destination held by the document search device 100. The page data DB 114 is a database containing information on respective pages of the document data of comparison destination held by the document search device 100.

The image region detection program 115 is a function of comparing a layout image of the document data of comparison source and images presented by the image data DB 112, and extracting a unit of an object of an image of comparison source, namely an image region of comparison source from the layout image of the document data of comparison source.

The processing of comparing the layout image of the document data of comparison source and the images presented by the image data DB 112, and extracting the image of comparison source from the layout image of the document data of comparison source is hereinafter referred to as template matching.

The layout image according to this embodiment is an image which is visually recognized by the user or the like via the display unit 104, and represents a content of document data. Therefore, the layout image contains texts, images, or both texts and images.

The document analysis program 116 is a function of acquiring a document structure of document data based on a type of software which has generated the document data. Moreover, the document analysis program 116 is also a function of extracting images, texts, and the like from document data from which a document structure can be acquired.

The document analysis program 116 is implemented by a software library (image extraction library) provided by a manufacturer or the like which has developed software for creating each piece of document data. The document search device 100 holds image extraction libraries provided by manufacturers and the like by an administrator and the like inputting the image extraction libraries to the storage unit 110 in advance.

The image feature amount generation program 117 is a function of calculating an image feature amount (multi-dimensional vector) representing apparent characteristics of an image. For example, a multi-dimensional vector representing a distribution of edge patterns in an image is generated using pixel value information of the image, and the dimension of the generated multi-dimensional vector is compressed by the principal component analysis, or the like. Then, an approximately several-ten- to several-hundred-dimensional vector is generated. Further, data for searching image, namely the image feature amount is calculated based on the generated vector.

The image reliability determination program 118 is a function of determining a reliability representing whether an image region, which is extracted by a plurality of methods described later, is a proper unit of image for searching for a document data in accordance with a reliability set to the plurality of methods.

The image search program 119 is a function of calculating a distance in terms of vector between an image feature amount of an image contained in the document data of comparison source and an image feature amount of each of the images contained in the document data of comparison destination. The image search program 119 is a function of then acquiring an image small in distance to the image of comparison source as an image high in apparent similarity, namely as the same image as a result of the calculation.

For the calculation of the distance according to this embodiment, any method can be used as long as the method can calculate a similarity between vectors such as a method of calculating a squared distance.

The document search program 120 is a function of searching for document data that is the same as or similar to the document data of comparison source, or a page of document data that is the same as or similar to the document data of comparison source using the image search result acquired by the image search program 119.

The screen display program 121 is a function of controlling the display unit 104 to display a list of search results or an image for browsing document data.

The data management program 122 is a function of storing image or document data input from the input unit 103 or the communication unit 105 in the storage unit 110. Moreover, the data management program 122 is a function of outputting the stored image or document data in response to a request of the respective functions.

It should be noted that the processor 101 operates as a functional module realizing a predetermined function by executing the program mentioned before. For example, the processor 101 functions as an image region detection module by executing the image region detection program 115, and functions as a document analysis module by executing the document analysis program 116. The same holds true for the other programs. Further, the processor 101 also operates as a functional module for realizing a plurality of pieces of processing executed by the programs, respectively. The document search device 100 of this embodiment is a device or a system including those functional modules.

FIG. 2 is an explanatory diagram illustrating the image data DB 112 according to the embodiment of this invention.

The image data DB 112 contains the information on the images contained in the document data of comparison destination held by the document search device 100. Specifically, the image data DB 112 contains information on images serving as templates to be compared with an image of comparison source. The information on the images serving as templates is stored in the image data DB 112 by registration processing described later according to this embodiment.

The image data DB 112 contains fields of serial number 1121, image ID 1122, image feature amount 1123, image 1124, document ID 1125, page number 1126, and coordinate 1127. The serial number 1121 is an identifier for uniquely identifying a row contained in the image data DB 112. The image ID 1122 is an identifier for uniquely identifying an image contained in the document data of comparison destination. The image feature amount 1123 contains numerical values representing apparent features of the image contained in the document data of comparison destination.

The image 1124 is an identifier or a name allocated to each of the images contained in the document data of comparison destination in order to display the image. The image 1124 of FIG. 2 indicates a file name of the image, but the image 1124 according to this embodiment may contain a server name, a directory name, and the like storing the image.

The document ID 1125 is an identifier for uniquely identifying document data containing the image indicated by the image 1124.

The page number 1126 indicates a page number of the document data represented by the document ID 1125 containing the image indicated by the image 1124.

The coordinate 1127 indicates a position at which the image indicated by the image 1124 is arranged on the page indicated by the page number 1126 and a size of the image. The coordinate 1127 of FIG. 2 indicates the position and the size of the image in coordinates in which the X and Y directions of each of the documents are respectively normalized to 100, but the coordinate 1127 of this embodiment may represent the position and the size of the image in another unit such as the pixel number.

For example, a row having the serial number 1121 of FIG. 2 of "1" indicates that an image having the image ID 1122 of "10000001" is arranged in a rectangular region enclosed by upper left coordinates (35,10) and lower right coordinates (60,35) on a first page of document data having the document ID 1125 of "000001".

A field of reliability 1128 indicates a confidence of the image indicated by the image 1124 as a unit, namely a reliability according to the embodiment. An image high in reliability of this embodiment indicates that the image is proper as an image to be searched for. In general, an image high in reliability is often an image meaningful to the user. The reliability 1128 of FIG. 2 indicates the reliability on four levels, 0 to 3, in ascending order, but any value or sign may be used as long as magnitude in reliability can be compared.

FIG. 3 is an explanatory diagram illustrating the document data DB 113 according to the embodiment of this invention.

The document data DB 113 contains fields of serial number 1131, document ID 1132, type 1133, document structure 1134, author 1135, update date 1136, and file path 1137. The serial number 1131 is an identifier for uniquely identifying a row contained in the document data DB 113.

The document ID 1132 is an identifier for uniquely identifying each of the document data of comparison destination held by the document search device 100. The type 1133 is an identifier for identifying a type of the document data indicated by the document ID 1132. In other words, the type 1133 indicates software used to create the document data, or a format in which the document data is saved.

The document structure 1134 indicates whether a document structure can be acquired from the document data indicated by the document ID 1132. For example, when the document search device 100 can acquire a document structure from document data, such as document data created by software used for creating a document, the document structure 1134 of the document data contains "1". Then, the document structure 1134 of a document data for which the document structure cannot be acquired contains "0".

According to this embodiment, document data from which the document structure can be acquired is document data from which only images contained in the document data can be separated from texts and the like so as to be extracted. Moreover, document data from which the document structure can be acquired is document data from which only texts contained in the document data can be separated from images and the like so as to be extracted.

According to this embodiment, an image in the minimum unit out of images contained in document data from which a document structure can be acquired is described as object image. In general, an object image is often an image such as a line or a circle, which is meaningless to the user.

Moreover, document data in which texts and images are referred to as images such as document data read by means of an image scanner device or protected document data is document data from which the document structure cannot be acquired. It is not possible to extract only images independently of texts from this document data.

The author 1135 indicates a person who has created or updated the document data indicated by the document ID 1132. The update date 1136 indicates a date on which the document data indicated by the document ID 1132 was created or updated last. It should be noted that the date represented by the update date 1136 may include a time. The file path 1137 indicates a location in the storage unit 110 at which the document data indicated by the document ID 1132 is stored.

The document ID 1132 of FIG. 3 and the document ID 1125 of FIG. 2 correspond to each other.

Figures 4, 5:
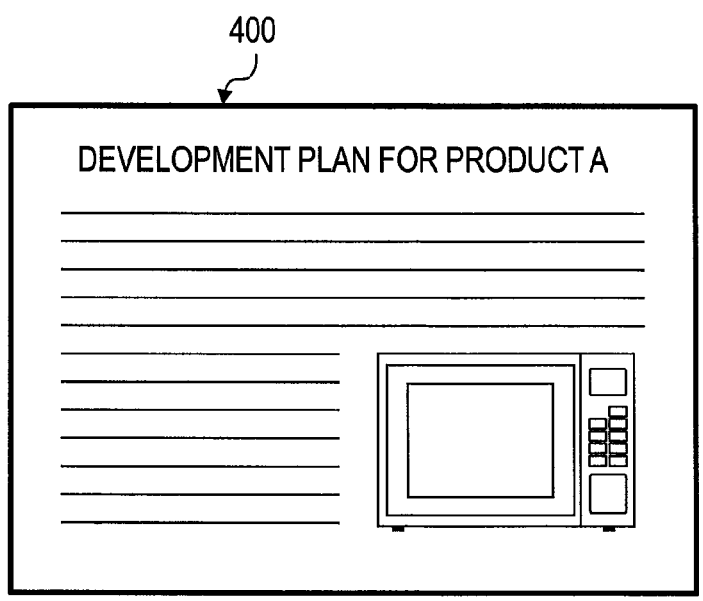
FIG. 4 is an explanatory diagram illustrating a page data DB according to the embodiment of this invention.
FIG. 5 is an explanatory diagram illustrating a layout image extracted by an image search program according to the embodiment of this invention.

FIG. 4 is an explanatory diagram illustrating the page data DB 114 according to the embodiment of this invention.

The page data DB 114 contains fields of serial number 1141, page ID 1142, image feature amount 1143, document ID 1144, page number 1145, and image 1146. The serial number 1141 is an identifier for uniquely identifying a row contained in the page data DB 114.

The page ID 1142 is an identifier for uniquely identifying a page contained in document data. The image feature amount 1143 is numerical values indicating apparent features of a layout image acquired from each page.

The document ID 1144 is an identifier of document data containing the page indicated by the page ID 1142. The page number 1145 is a page of the document data including the page indicated by the page ID 1142. The image 1146 is an identifier for uniquely identifying a layout image acquired from the page indicated by the page ID 1142.

For example, in a row having the serial number 1141 of "1" in FIG. 4, a page having the page ID 1142 of "1000001" is contained on the 1st page of document data having the document ID 1144 of "000001".

The document ID 1144 of FIG. 4, the document ID 1132 of FIG. 3, and the document ID 1125 of FIG. 2 correspond to one another. The page number 1145 of FIG. 4 and the page number 1126 of FIG. 2 correspond to each other.

A description is now given of template matching by the image region detection program 115.

For the template matching according to this embodiment, a general method such as a method of comparing a layout image and an image with each other by pattern recognition, or a method of comparing a layout image and an image with each other by searching for image feature amounts is employed.

FIG. 5 is an explanatory diagram illustrating a layout image 400 acquired by the image region detection program 115 according to the embodiment of this invention.

The layout image 400 of FIG. 5 contains an image of a microwave oven on the lower right side, and the other region contains texts. The layout image 400 of FIG. 5 is a layout image acquired from each of pages of document data.

For example, when the layout image 400 is acquired from document data input to the document search device 100, the image region detection program 115 extracts images in rectangular regions of various shapes and sizes from the layout image 400, thereby generating a plurality of image region candidates 401.

Figure 6:
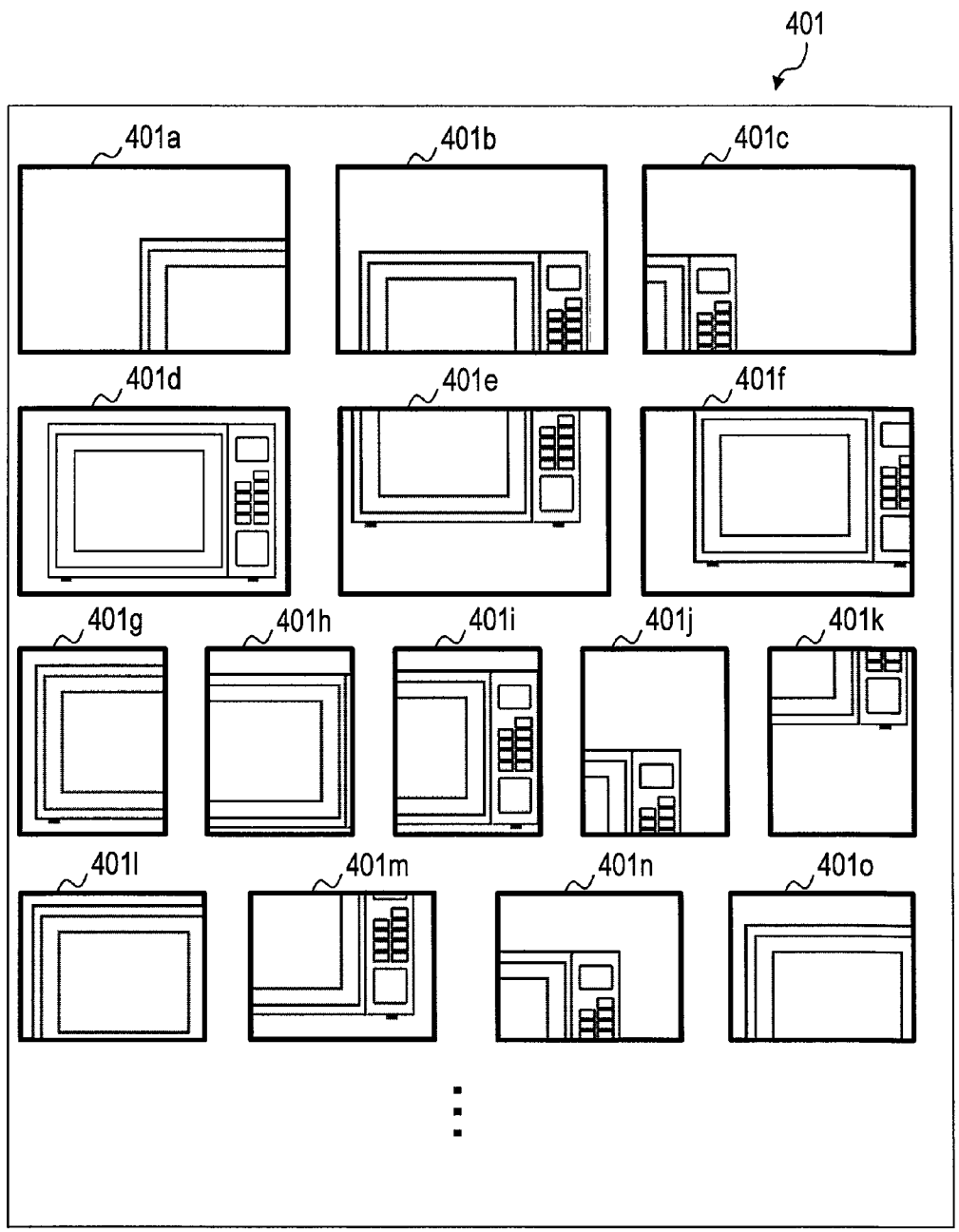
FIG. 6 is an explanatory diagram illustrating a plurality of image region candidates extracted from the layout image according to the embodiment of this invention.

FIG. 6 is an explanatory diagram illustrating the plurality of image region candidates 401 extracted from the layout image 400 according to the embodiment of this invention.

The image region candidates 401 illustrated in FIG. 6 include a plurality of image region candidates (401a-401o). The image region candidates (401a-401o) are a plurality of images each extracted by cutting out a part of the layout image 400.

The image region detection program 115 searches for a proper image as an image of comparison source out of the image region candidates (401a-401o) by an image of comparison destination presented by the image data DB 112 as a template. Then, the image region detection program 115 extracts an image region candidate 401 that is the same as or similar to the image of comparison destination presented by the image data DB 112 from the image region candidates (401a-401o).

When the image of comparison destination presented by the image data DB 112 is the same as or similar to the image region candidate 401d (microwave oven arranged on the lower right side of the layout image 400), the image region detection program 115 according to this embodiment extracts the image region candidate 401d as a search result.

On this occasion, when a sufficiently large amount of information on images are accumulated in the image data DB 112, the image region detection program 115 may use only images high in reliability 1128 (such as images having the reliability of 3) in the image data DB 112 as the templates. As a result, it is possible to prevent images which are not appropriate for comparison destinations from being used as templates, thereby preventing image region candidates 401 which are not to be extracted from being extracted.

A description is now given of a method of calculating, by the image feature amount generation program 117, image feature amounts.

Figure 7:
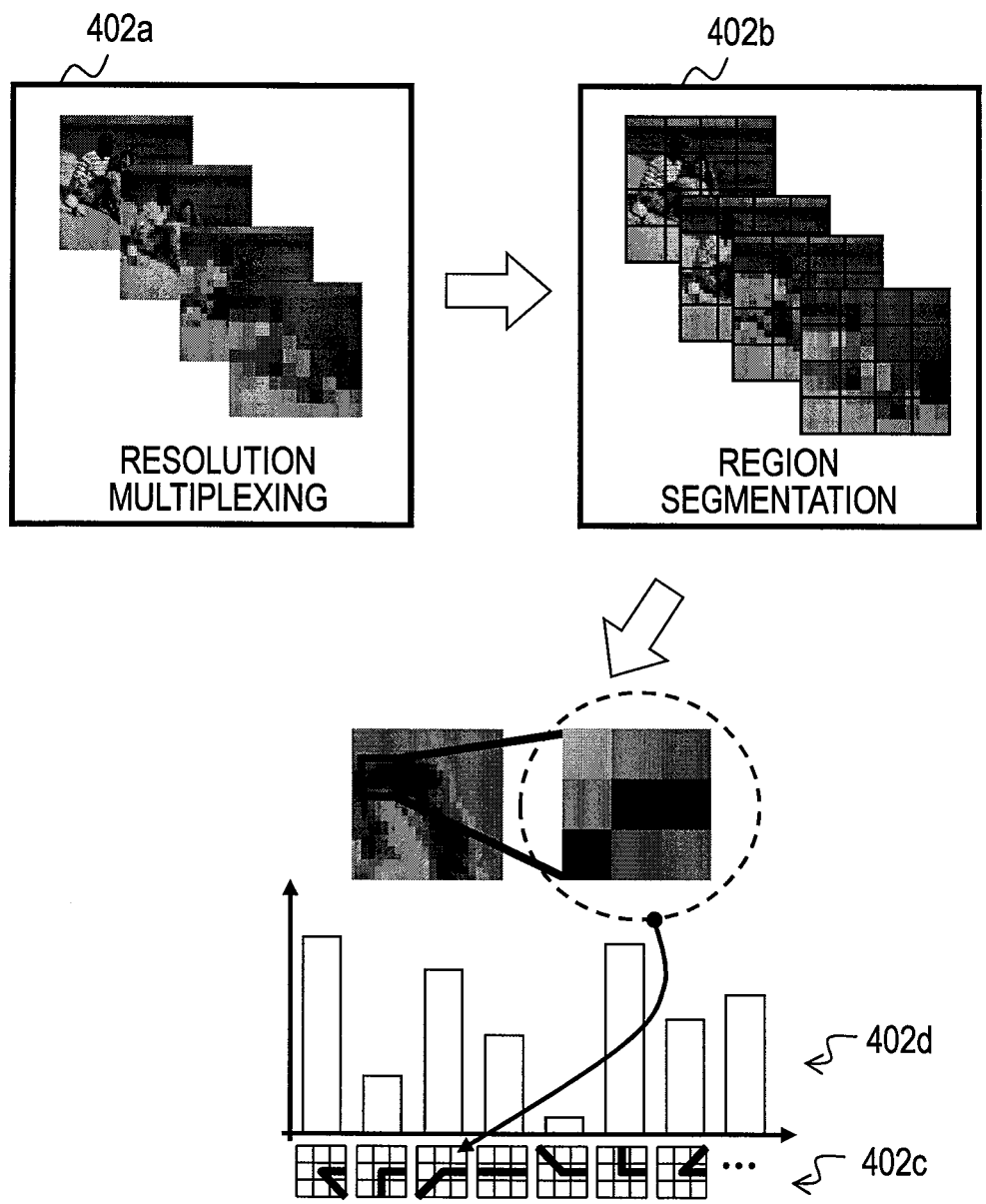
FIG. 7 is an explanatory diagram illustrating an image feature amount by an image feature amount generation program according to the embodiment of this invention.

FIG. 7 is an explanatory diagram illustrating the method of calculating the image feature amount by the image feature amount generation program 117 according to the embodiment of this invention.

An image 402a contains images shown in a plurality of resolutions. An image 402b contains images in which each of the images contained in the image 402a is divided into a plurality of regions. Edge patterns 402c are characteristic edge patterns corresponding to each of the divided regions in the image 402b. Numerical values 402d are numerical values of the feature amounts corresponding to the edge patterns 402c.

The image feature amount generation program 117 holds, in advance, a plurality of characteristic edge patterns such as the edge patterns 402c illustrated in FIG. 7. Moreover, the image feature amount generation program 117 also holds, in advance, the numerical values 402d corresponding to the respective edge patterns 402c.

On the other hand, the image feature amount generation program 117 generates the plurality of images contained in the image 402a by resolution-multiplexing, namely converting, the image for which the image feature amount is calculated into images shown in a plurality of resolutions. Further, the image feature amount generation program 117 generates the plurality of images contained in the image 402b by dividing the each of the generated images of the image 402a into regions in a lattice pattern.

Then, the image feature amount generation program 117 sums numbers of the characteristic edge patterns contained in each of the divided regions of the image 402b based on the edge patterns 402c and the numerical values 402d, thereby generating a multi-dimensional vector. The image feature amount generation program 117 calculates the image feature amount by compressing the dimension of the multi-dimensional vector by the principal component analysis.

As a feature amount indicating an apparent feature of an image according to this embodiment, feature amounts such as the edge histogram feature provided in the MPEG-7, which is generally known, or the SIFT feature may be used.

A description is now given of steps of registering document data of comparison destination to the document search device 100.

Figure 8:
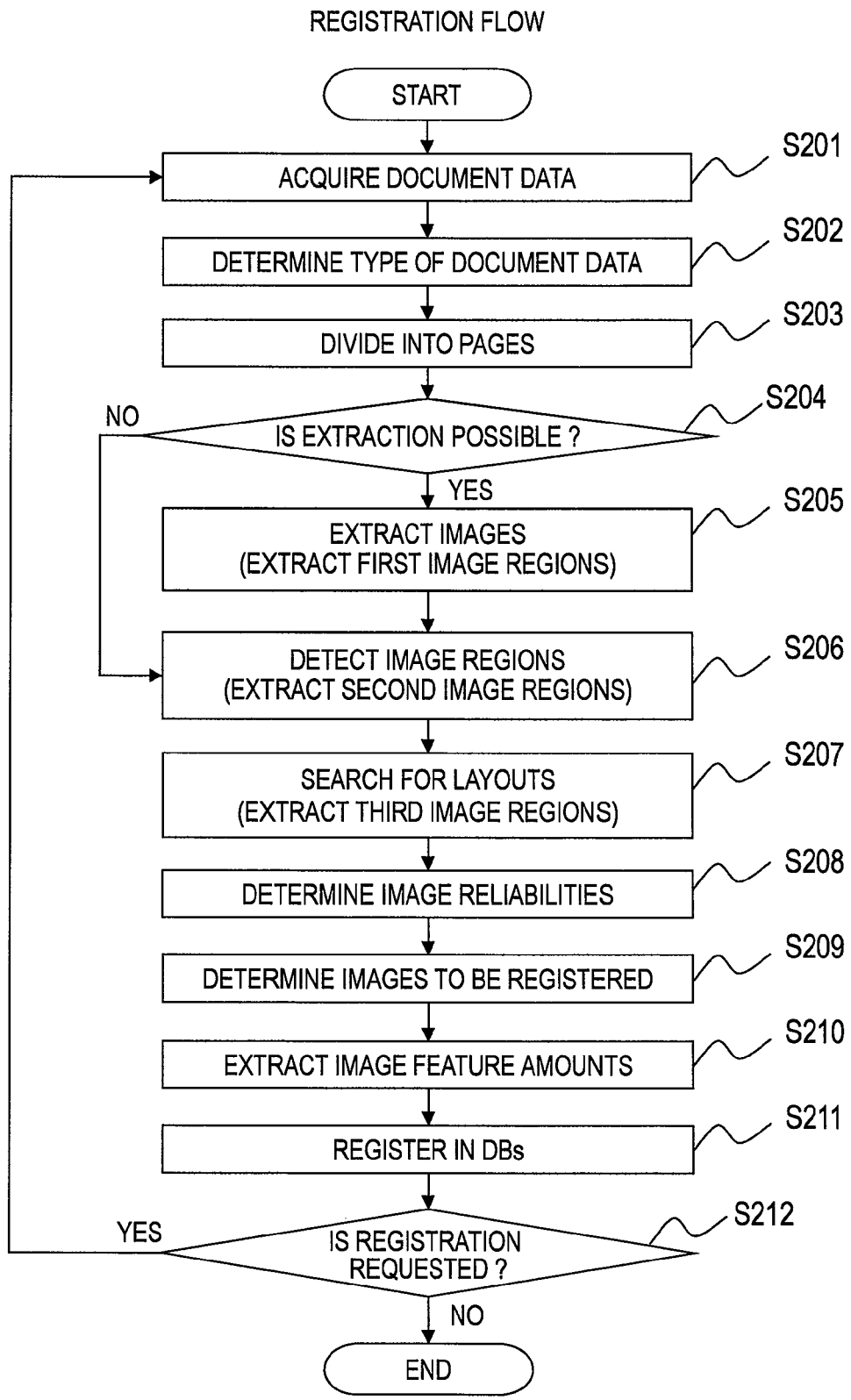
FIG. 8 is a flowchart illustrating registration processing of document data according to the embodiment of this invention.

FIG. 8 is a flowchart illustrating the registration processing of the document data according to the embodiment of this invention.

The registration processing according to this embodiment refers to processing of storing information on images, document data, and pages in the image data DB 112, the document data DB 113, and the page data DB 114, and storing the document data and images in the storage unit 101 of the document search device 100 or a storage device coupled to the document search device 100.

In the registration processing for the document data illustrated in FIG. 8, as described above, the document data to be stored in the storage unit 101 of the document search device 100 is described as the document data of comparison source.

First, in order to store the document data of comparison source in the main memory 102 of the document search device 100 illustrated in FIG. 1, the screen display program 121 controls the display unit 104 to display a screen 403 for acquiring a folder or a file in which the document data is to be stored.

Figures 9, 10:
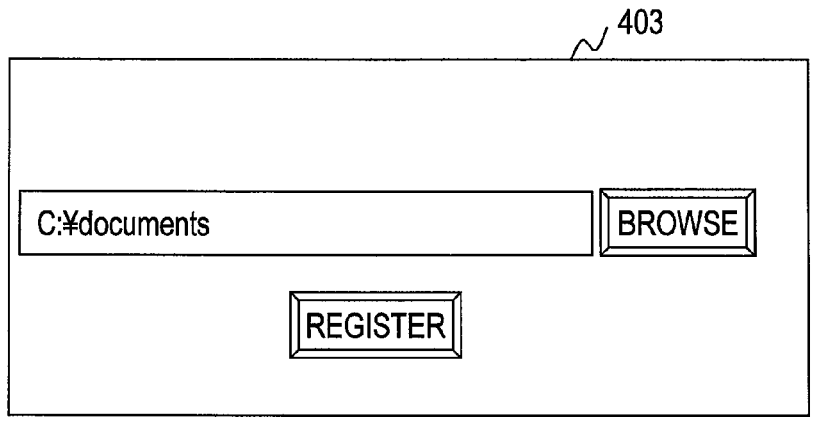
FIG. 9 is an explanatory diagram illustrating a screen displayed on a display unit, for acquiring a folder or a file in which the document data is to be stored according to the embodiment of this invention.
FIG. 10 is an explanatory diagram illustrating determination criteria containing images to be registered and reliabilities according to the embodiment of this invention.

FIG. 9 is an explanatory diagram illustrating the screen 403 displayed on the display unit 104, for acquiring a folder or a file in which the document data is to be stored according to the embodiment of this invention.

The screen display program 121 controls the display unit 104 to display the screen 403, for example, thereby enabling the user to input a folder or file in which the document data is to be stored.

Then, when the input unit 103 receives a storage location of a folder or a file in which the document data of comparison source is to be stored, and an instruction to register the document data of comparison source from the user, the data management program 122 acquires the document data from the specified storage location, and stores the acquired document data in the main memory 102 (S201). It should be noted that the data management program 122 may store the document data in the storage unit 110 or the like other than the main memory 102.

Specifically, the data management program 122 acquires the document data in accordance with the instruction of the user from a server or the like coupled to a network or the like via the communication unit 105. Alternatively, the data management program 122 acquires the document data from a folder or a file directly input by the user on the input unit 103.

It should be noted that, in S201, the data management program 122 may periodically check whether or not document data is stored in the specified folder, and may automatically acquire newly stored document data or updated document data.

After S201, the document analysis program 116 determines the type 1133 of the document data stored in the main memory 102 (S202). The document analysis program 116 holds information on the type of each piece of the document data in advance, and determines the type 1133 from the header of the document data or the like.

After S202, the document analysis program 116 separates pages of the document data by means of software library (image extraction library) corresponding to the determined type 1133 in order to process the document data per page (S203). On this occasion, it is only necessary for the document analysis program 116 to refer to the document data per page, and it is not necessary to actually divide the file. In other words, the document analysis program 116 may carry out processing described later per page by allocating an identifier for identifying each page.

After S203, the document analysis program 116 determines whether or not extraction of images and texts from the document data using the image extraction library held by the document analysis program 116 itself in advance is possible (S204). In other words, the document analysis program 116 determines whether or not the image extraction library for acquiring a document structure such as images and texts from the document data is held by the document analysis program 116 itself.

On this occasion, when it is determined that images and the like can be extracted using the image extraction library held by the document analysis program 116, the document analysis program 116 extracts images from the document data. The image extracted by the image extraction library is high in reliability as an image.

The document analysis program 116 generates information on the extracted image, such as an identifier for identifying the extracted image (corresponding to the image ID 1122), a name allocated to the extracted image (corresponding to the image 1124), an identifier for identifying the document data containing the extracted image (corresponding to the document ID 1125), an identifier for identifying the page containing the extracted image (corresponding to the page number 1126), and a display position of the image on each of the pages (corresponding to the coordinate 1127). Then, the document analysis program 116 stores the extracted images as image regions by means of a first method (hereinafter, referred to as first image regions) in a buffer area held by the main memory 102 (S205). Moreover, the generated information is also stored in the buffer area.

It should be noted that the document analysis program 116 cannot estimate whether a grouped image is an image generated by grouping object images which are minimum units, or an image generated by grouping a plurality of images. Therefore, when a grouped image is extracted by the image extraction library, the document analysis program 116 according to this embodiment extracts both object images, which are the minimum units, and grouped images in S205. Then, the document analysis program 116 stores information on all the extracted images as first image regions in the buffer area held by the main memory 102.

After S205 or when the document analysis program 116 determines in S204 that a document structure cannot be acquired from the document data, the image region detection program 115 acquires a layout image for each of the pages contained in the document data. Then, the image region detection program 115 determines whether or not there are images that are the same as or similar to a part of the acquired layout image in the images presented by the image data DB 112.

The image region detection program 115 determines whether or not there are images that are the same as or similar to a part of the acquired layout image in the images presented by the image data DB 112 by means of the template matching illustrated in FIGS. 5 and 6. Therefore, even when it is determined in S204 that a document structure cannot be acquired, the image region detection program 115 can extract images that are the same as or similar to images presented by the image data DB 112 from the layout image.

When it is determined that an image presented by the image data DB 112 is the same as or similar to a part of the layout image, and an image is extracted from the layout image, the image extracted from the layout image is a high in reliability as an image.

Therefore, the image region detection program 115 generates information on the image, such as an identifier for identifying the image extracted from the layout image, namely the image region corresponding to the image portion of the document data (corresponding to the image ID 1122), an identifier for identifying the document data from which the layout image is acquired (corresponding to the document ID 1125), an identifier for identifying the page of the document data from which the layout image is acquired (corresponding to the page number 1126), and a display position of the image in the layout image (corresponding to the coordinate 1127). Then, the image region detection program 115 stores the images extracted from the layout image as image regions by means of a second method (hereinafter, referred to as second image regions) in the buffer area held by the main memory 102 (S206). Moreover, the generated information is also stored in the buffer area.

On this occasion, when the quantity of the images presented by the image data DB 112 is small, for example, immediately after the document search device 100 according to this embodiment starts operation, and even when an image is contained in the layout image, there may be no template of an image presented by the image data DB 112 which is the same as or similar to the image, and hence the image region detection program 115 may not be able to acquire the image. Therefore, the extraction miss may be prevented by the user or the like inputting images to the image data DB 112 in advance.

The images of comparison destination held by the document search device 100 include images high in reliability. Therefore, the document search device 100 according to this embodiment can extract an image high in reliability appropriate for the search from the document data of comparison source in S206.

It is only necessary for the document search device 100 according to this embodiment to search document data by means of a step described later, and the document search device 100 does not need to extract image regions without a miss in S206. In other words, there may be image regions which cannot be extracted from the document data.

After S206, the image feature amount generation program 117 calculates an image feature amount of a layout image from each page of the document data of comparison source according to the step illustrated in FIG. 7. The layout image acquired from each page of the document data may be the layout image acquired in S206 or a layout image acquired again in S207.

Then, the image search program 119 carries out a search for similar images by calculating a distance between the image feature amount 1143 of the page presented by the page data DB 114 and the image feature amount of each layout image calculated by the image feature amount generation program 117.

A layout image smaller in calculated distance than a predetermined threshold is the same as or similar to any page presented by the page data DB 114. In other words, the layout image smaller in the calculated distance than the predetermined threshold is high in reliability as an image.

Therefore, the image search program 119 extracts a layout image smaller in calculated distance than the predetermined threshold from the document data. The image search program 119 generates information on the extracted layout image, such as an identifier for identifying the extracted layout image (corresponding to the image ID 1122), a name allocated to the extracted layout image (corresponding to the image 1124), an identifier for identifying the document data containing the extracted layout image (corresponding to the document ID 1125), an identifier for identifying the page containing the extracted layout image (corresponding to the page number 1126), and a display position of the layout image on each of the pages (corresponding to the coordinate 1127).

Then, the image search program 119 stores the extracted layout images as image regions by means of a third method (hereinafter, referred to as third image regions) in the buffer area held by the main memory 102 (S207). Moreover, the generated information on the layout image is also stored in the buffer area.

The above-mentioned layout image may contain texts in Japanese or a language other than Japanese. In other words, the processing in S207 is processing of acquiring the document data as a layout image, and the document search device 100 according to this embodiment can thus extract document data that is the same as or similar to the document data of comparison source from the document data of comparison destination independently of texts and languages.

After S207, the image reliability determination program 118 acquires the first image region, the second image region, and the third image region from the buffer area held by the main memory 102, and determines reliabilities of the images contained in the document data (S208).

Specifically, the image reliability determination program 118 calculates an area Si in which the first, second and third image regions are mutually overlap, and an area So in which the first, second and third image regions do not overlap in S208. Then, the image reliability determination program 118 calculates a ratio Sd (Sd=So/(Si×N)) by which the image regions are different from each other. It should be noted that an overlapping ratio may be determined by calculating a reciprocal of the difference ratio Sd, and the overlap ratio may be used in subsequent processing.

On this occasion, the integer N represents the number of overlapping image regions out of the first, second, and third image regions. For example, when the image regions (first and second image regions) extracted by means of two methods, the first method and the second method, overlap, N=2, and when the first, second, and third image regions overlap, N=3.

When the value of the difference ratio Sd is lower than a threshold determined in advance by the user or the like, the overlapping area Si is large. In other words, any combination of the image regions out of the first, second, and third image regions overlap in many portions. For example, when N=3, and the value of the difference ratio Sd is equal to or less than the threshold, the first, second, and third image regions overlap in many portions.

Therefore, the image reliability determination program 118 determines that any combination of the first, second, and third image regions, for which the value of the difference ratio Sd is lower than the predetermined threshold, corresponds to overlapping images. The each of the image regions contained in the combination which is determined as overlapping images is high in reliability as an image.

Moreover, when the value of the difference ratio Sd is more than the threshold determined in advance by the user or the like, the non-overlapping area So is large. It means at least one combination of the image regions out of the first, second, and third image regions corresponds to different images. Therefore, the image reliability determination program 118 determines that the combination of the first, second, and third image regions, for which the difference ratio Sd is higher than the threshold, corresponds to a combination of different images.

FIG. 10 is an explanatory diagram illustrating determination criteria 404 containing images to be registered and reliabilities according to the embodiment of this invention.

The determination criteria 404 contain fields of serial number 4041, first image region 4042, second image region 4043, third image region 4044, image to be registered 4045, and reliability 4046. The serial number 4041 is an identifier for uniquely identifying each row of the determination criteria 404.

To the first image region 4042, the second image region 4043, and third image region 4044, the image regions extracted in S205, S206, and S207 correspond. Then, information on a combination of image regions which are determined to overlap in the above-mentioned processing is stored.

For example, a row in which "○" is stored for at least two of the first image region 4042, the second image region 4043, and the third image region 4044 indicates that the image regions corresponding to columns in which "○" is stored are overlapping images. On the other hand, a row in which "○" is stored for only one of the first image region 4042, the second image region 4043, and the third image region 4044 indicates that the image region corresponding to a column in which "○" is stored does not have other overlapping images.

The image to be registered 4045 indicates which image region is to be registered to the document search device 100. The reliability 4046 indicates a reliability of the image region.

For example, when it is determined in S208 that a difference ratio Sd between the first image region and the second image region is lower than the threshold, and a difference ratio Sd between the first image region and the third image region is higher than the threshold, the first image region and the second image region are overlapping images, and the first image region and the third image region are different images. Therefore, the image reliability determination program 118 identifies a row having the serial number 4041 of "6" in the determination criteria 404 in S208. Then, the image reliability determination program 118 determines the reliability 4046 to be "2" in S208.

When the row having the serial number 4041 of "6" is identified, "2" is determined as the reliability 4046 for the first and second image regions corresponding to columns in which "○" is stored. Moreover, the third image region corresponding to a column in which "x" is stored does not have another overlapping region, and "1" is thus determined for the reliability 4046.

Moreover, when the value of the difference ratio Sd exceeds the threshold for any of the first, second, and third image regions in S208, the first, second, and third image regions are images different from each other. In this case, the image reliability determination program 118 identifies rows having the serial numbers 4041 of "7", "3", and "2" in the determination criteria 404 in S208. Then, the image reliability determination program 118 determines the reliability 4046 corresponding to the first, second, and the third regions to be "1"

After S208, the image reliability determination program 118 determines an image to be registered to the document search device 100 (S209).

For example, when it is determined in S208 that a difference ratio Sd between the first image region and the second image region is lower than the threshold, and a difference ratio Sd between the first image region and the third image region is higher than the threshold, the image reliability determination program 118 identifies the row having the serial number 4041 of "6" in the determination criteria in S209. The image reliability determination program 118 determines to "employ first image region" from the image to be registered 4045 contained in the identified row in S209. As a result, the image reliability determination program 118 determines to register the first image region to the image data DB 112.

On this occasion, when an image region having low reliability is also to be registered to the document search device 100, an image region having no other overlapping image region may be registered. For example, when the value of the difference ratio Sd of any of the first, second, and third image region exceeds the threshold in S208, the image reliability determination program 118 may identify rows having the serial numbers 4041 of "7", "3", and "2" in the determination criteria 404 in S209. Then, the image reliability determination program 118 may determine to register the first, second, and third image regions to the image data DB 112.

In the determination criteria 404 according to this embodiment, the highest reliability is set to the first method, the second highest reliability is set to the second method, and a low reliability is set to the third method. This is because, in this embodiment, an image extracted from document data from which a document structure can be acquired is the highest in reliability. Moreover, this is because a layout image extracted in accordance with the image feature amounts is the lowest in reliability.

Therefore, when the first image region and the second image region overlap, the determination criteria 404 is defined so that the first image region is to be registered. Moreover, when the second image region and the third image region overlap, the determination criteria 404 are defined so that the third image region is to be registered.

The determination criteria 404 illustrated in FIG. 10 are examples, and the values of the determination criteria 404 according to this embodiment may be determined in advance by the user or the like according to the purpose.

In this way, the document search device 100 according to this embodiment registers templates proper for the document search to the image data DB 112 by employing any of the extracted image regions based on the plurality of methods including the first, second, and third methods, and registering the employed image region to the image data DB 112. Moreover, an image region high in reliability can be extracted by comparing registered images with an image or layout image extracted from document data.

Moreover, the document search device 100 according to this embodiment extracts image regions by means of the second and third method, which means that the same image regions are not necessarily extracted, and that similar image regions can be extracted.

After S209, the image feature amount generation program 117 calculates the image feature amount 1123 from the image region which is determined to be registered (S210). The calculation method for the image feature amount 1123 is the same as the method illustrated in FIG. 7. Moreover, the image feature amount generation program 117 may calculate an image feature amount (corresponding to the image feature amount 1143) of a page of the document data containing the image region determined to be registered in S209.

After S210, the data management program 122 stores, in the image data DB 112, the calculated image feature amount 1123, the reliability of each of the image regions determined in S208 (corresponding to the reliability 1128), and the information on the images stored in the buffer area in S205, S206, and S207. Moreover, the data management program 122 generates information on the document data and information on the page, which contain the image region determined to be registered, and stores the generated information in the document data DB 113 and the page data DB 114 (S211).

In S211, the data management program 122 stores the type of the document data determined in S202 in the type 1133 of the document data DB 113, and stores the determination result on whether or not the document structure can be extracted in S204 in the document structure 1134 of the document data DB 113. Moreover, the data management program 122 stores the image feature amount of the page of the document data calculated in S210 in the image feature amount 1143 of the page data DB 114.

Moreover, the data management program 122 stores in S211 the image region determined to be registered in S209 and the document data containing the image region determined to be registered in S209 in the storage unit 110 or a storage device coupled to the document search device 100.

As a result, the image region determined to be registered and the document data containing the image region are accumulated as the document data and the image of comparison destination in the document search device 100.

After S211, the document search program 120 determines whether or not there is a request for registration of another piece of document data, and when there is a registration request, carries out the processing from S201 to S211. Moreover, when there is not a registration request, the document search program 120 finishes the processing (S212).

According to the registration method for document data according to this embodiment, an image appropriate for search can be extracted even from document data which is difficult to extract an image from the document structure, such as document data containing an image which is not clear as to the unit of image, or document data acquired by an image scanner. Moreover, images high in reliability can be accumulated, and the document search device 100 according to this embodiment can increase accuracy of the search processing each time when the registration processing is carried out.

Figure 11:
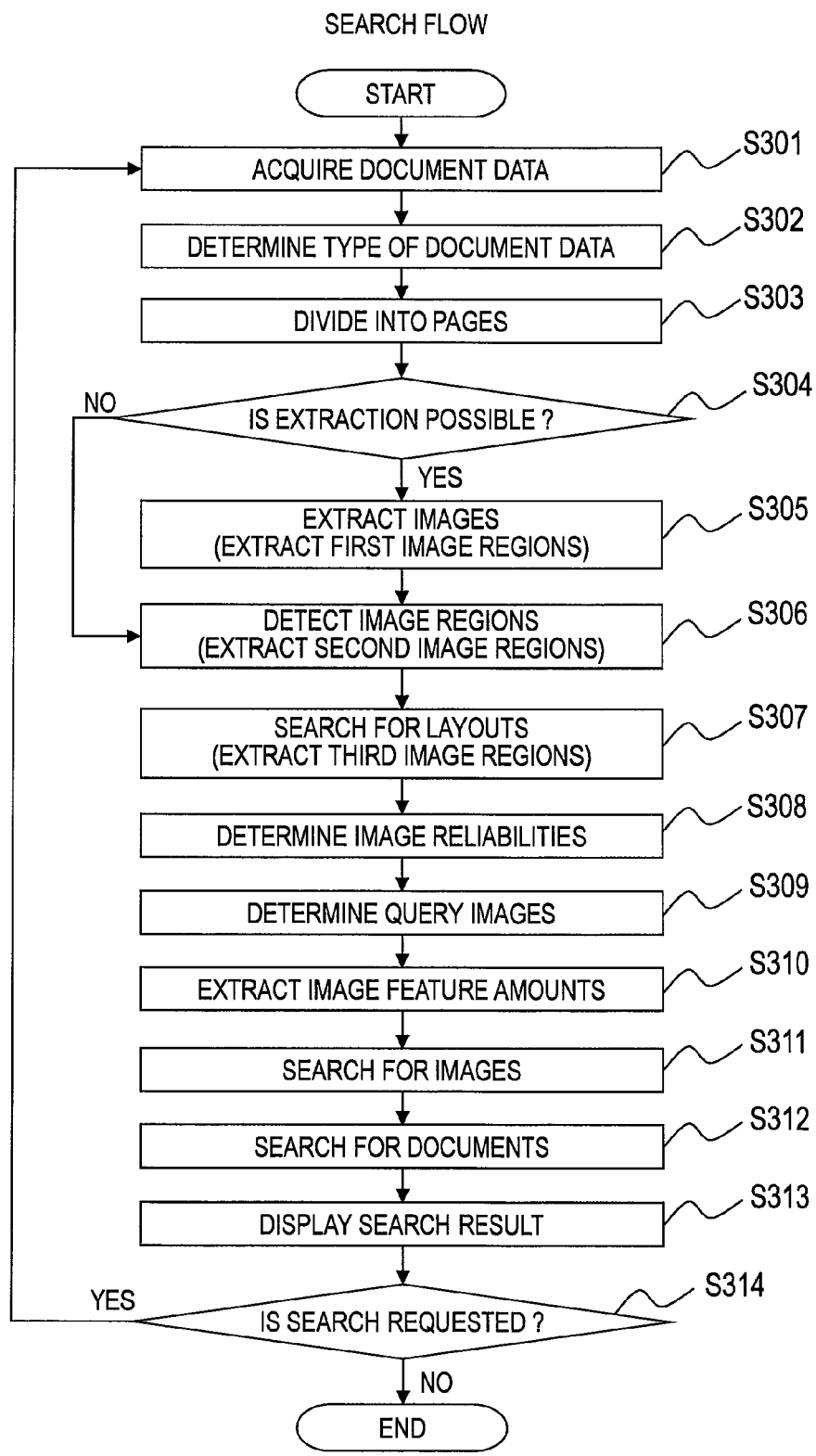
FIG. 11 is a flowchart illustrating processing of searching for document data according to the embodiment of this invention.

FIG. 11 is a flowchart illustrating processing of searching for document data according to the embodiment of this invention.

First, in order to store the document data of comparison source in the main memory 102 of the document search device 100 illustrated in FIG. 1, the screen display program 121 controls the display unit 104 to display a screen 405 for acquiring a folder or a file in which the document data is to be stored.

Figure 12:
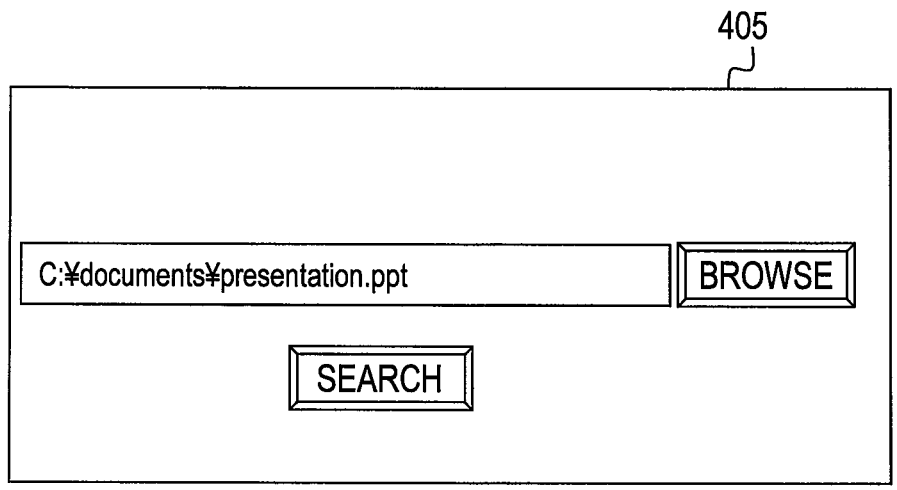
FIG. 12 is an explanatory diagram illustrating a screen displayed on the display unit, for acquiring a folder or a file in which the document data is to be stored according to the embodiment of this invention.

FIG. 12 is an explanatory diagram illustrating the screen 405 displayed on the display unit 104, for acquiring a folder or a file in which the document data is to be stored according to the embodiment of this invention.

The screen display program 121 controls the display unit 104 to display the screen 405, for example, thereby enabling the user to input a folder or file in which the document data is to be stored.

Then, when the input unit 103 receives a stored location of a folder or a file storing document data of comparison source, and an instruction to search for document data, the data management program 122 acquires the document data of comparison source from the instructed stored location as in S201 (S301).

The document search device 100 searches the document data of comparison destination held by the document search device 100 for similar document data with the document data of comparison source input in S301 being used as a query document.

After S301, the document analysis program 116 carries out processing in S302, S303, S304, and S305. S302 is the same as S202 of FIG. 8; S303, S203 of FIG. 8; S304, S204 of FIG. 8; and S305, S205 of FIG. 8.

Moreover, the image region detection program 115 carries out processing in S306, the image feature amount generation program 117 carries out processing in S307, and the image reliability determination program 118 carries out processing in S308. S306 is the same as S206 of FIG. 8; S307, S207 of FIG. 8; and S308, S208 of FIG. 8.

First, second, and third image regions of the document data of comparison source input in S301 are extracted by the processing in S302-S308 of FIG. 11.

Figure 13:
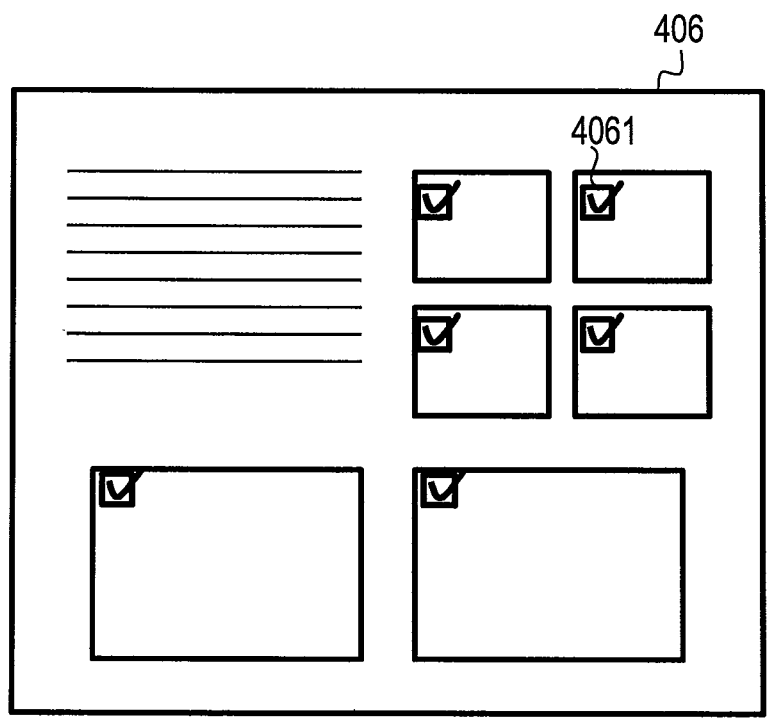
FIG. 13 is an explanatory diagram illustrating a screen displaying image regions according to the embodiment of this invention.

After S308, the image display program 121 controls the display unit 104 to display the first, second, and third image regions extracted in the above-mentioned steps as a screen 406 illustrated in FIG. 13. Then, the image display program 121 prompts the user to select an image region to be used as the query image out of the image regions displayed on the screen 406 (S309).

FIG. 13 is an explanatory diagram illustrating the screen 406 displaying the image regions according to the embodiment of this invention.

The screen 406 displays the first, second, and third image regions extracted by the processing up to S307, and includes areas 4061 for allowing the user to select image regions. The area 4061 of FIG. 13 is a checkbox, but any selection method may be employed as long as the user can make the selection.

The screen display program 121 can delete image regions which the user does not want to use as the query image by displaying the image regions as in FIG. 13 and letting the user select a displayed image region. Moreover, the document search device 100 searches the document data of comparison destination held by the document search device 100 for images similar to the query images selected by the user in the following processing.

In S309, the first, second, and third image regions extracted by the processing up to S307 may be displayed in a descending order of the reliabilities (corresponding to the reliability 4046) determined in S308. Moreover, image regions extracted from document data containing a plurality of pages may be displayed so that each of the pages thereof is displayed on the screen 406. Moreover, the user may select a plurality of image regions in S309.

Moreover, when the user does not want to carry out the processing in S309, the screen display program 121 may instruct the image feature amount generation program 117 to carry out processing in S310 without executing the processing in S309. When the processing in S309 is not carried out, the image feature amount generation program 117 may identify an image to be registered 4045 out of the determination criteria 404 after S308, and may use an image region indicated by the identified image to be registered 4045 as the query image.

After S309, the image feature amount generation program 117 individually calculates an image feature amount of each of the query images selected by the user in S309 (S310).

After S310, the image search program 119 calculates a distance between the calculated image feature amount of each of the query images and each of the image feature amounts 1123 held by the image data DB 112. Then, the image search program 119 extracts rows having the image feature amount 1123 for which the calculated distance is lower than the threshold determined in advance by the user or the like. As a result, images that are the same as or similar to the query images can be extracted from the image data DB 112 (S311).

On this occasion, the query images selected in S308 are high in reliability as images proper for the search. Therefore, the image search program 119 stores a value of high reliability in the reliability 1128 of the rows extracted in S311. According to this embodiment, the highest reliability is 3.

After S311, the document search program 120 searches the document data or pages of comparison destination based on images (hereinafter, referred to as image search results) corresponding to the rows extracted in S311, thereby extracting document data or pages (hereinafter, referred to as document search results) that are the same as or similar to the document data of comparison source (S312).

In S312, the document search program 120 extracts the document search results by means of any of methods of searching for document data described later for each of the pages containing the query image based on the image search results. It should be noted that the extracted document data of comparison destination includes pages in the following description.

According to a first method of searching for document data, the document search program 120 extracts first to M-th images of comparison destination (M is an integer determined in advance by the user or the like) in an ascending order of the distance or images of comparison destination, the distance of which is lower than a predetermined threshold, out of the image search results extracted in S311. Then, the document search program 120 identifies the document IDs 1125 or page numbers 1126 in the image data DB 112 corresponding to the extracted images of comparison destination.

Then, the document search program 120 determines a document ID 1125 or a page number 1126 having the largest number of times of identification as the document search result out of the document IDs 1125 or the page numbers 1126 corresponding to the extracted images of comparison destination. In other words, the document search program 120 identifies the document ID 1125 or the page number 1126 of the document data containing the largest number of the images of comparison destination small in distance to the query images, and determines the identified result as the document search result.

When a plurality of images contained in the same document data or page are extracted as image search results for one query image, the document search program 120 adds 1 to the number of times of identification for each of the plurality of images contained in the document data or page. As a result, the document search program 120 calculates the number of times of the identification of the document or page.

Similar pieces of document data generally contain a large number of common images. Therefore, the document search program 120 can search for document data or a page higher in similarity by summing the number of times of identification for each of the images corresponding to one query image, which are contained in the document data or page.

Further, according to a second method of searching for document data, the document search program 120 calculates a sum of areas of the images of the image search results for each piece of document or each page, and determines document data or a page large in calculated sum of areas as the document search result. When a plurality of images corresponding to one query image, and are contained in the same document data or page are extracted as the image search results, the sum of areas is calculated using an area of an image closest in distance.

Common images generally occupy a larger area in similar pieces of document data. As a result, the document search program 120 can search for document or a page higher in similarity by using the sum of areas of the images of the image search results.

Further, the document search program 120 may use both of the above-mentioned methods.

When both of the two methods are used, the document search program 120 may further extract document data or pages common to the document search results by the two methods as a document search result on a higher level. Moreover, when the number of the images of comparison destination presented by the image data DB 112 is large, image search results may be extracted using the reliability 1128 and the type of image (photograph or graphic). Specifically, an image high in the reliability 1128 may be extracted as an image search result.

Figure 14:
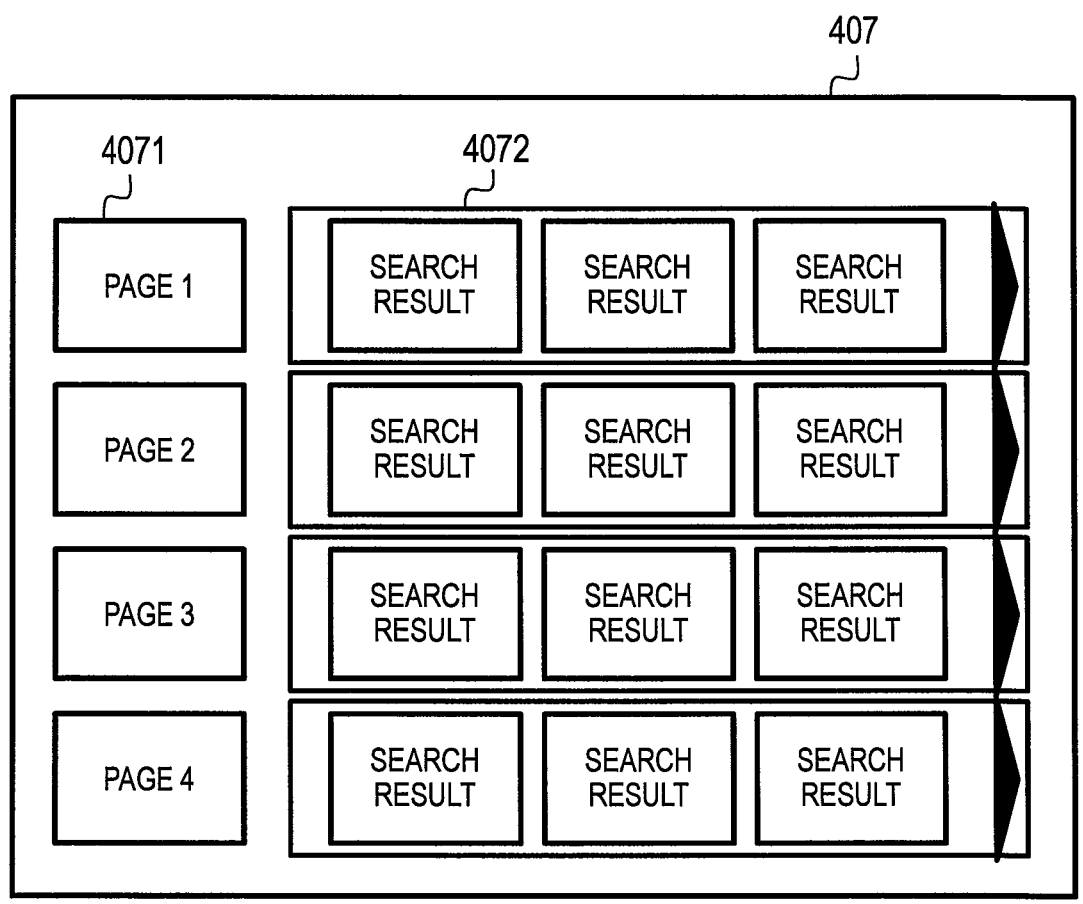
FIG. 14 is an explanatory diagram illustrating a screen displaying document search results according to the embodiment of this invention.

After S312, the screen display program 121 controls the display unit 104 to display an image 407 illustrated in FIG. 14 for presenting the document search result to the user (S313).

FIG. 14 is an explanatory diagram illustrating the screen 407 displaying the document search results according to the embodiment of this invention.

The screen 407 of FIG. 14 contains areas of query images 4071 and search results 4072. The query image 4071 is an area for displaying a query image for each page. The search result 4072 displays the document search results acquired in S312 in a descending order of the similarity (in an ascending order of the distance) or reliability.

As described above, even when a part of pages are reused as other pages, or a part in a page is reused as a result of reediting, similar document data can be searched for by displaying the search results for each page.

When the search is carried out not per page but per document data, the screen display program 121 can present a search result for each piece of document data to the user by displaying document data contained a large number of times in a document search result for a plurality of pages as the search results 4072.

After S313, the document search program 120 determines whether or not there is a request for searching for another piece of document data (S314), and when there is a request for the search, the document search program 120 returns to S301. Moreover, when there is not a request for the search, the document search program 120 ends the processing.

After S309, the query image selected in S308 may be registered to the image data DB 112. Specifically, the image reliability determination program 118 may determine the query image selected in S308 as an image to be registered to the storage unit of the document search device 100.

Then, the image feature amount generation program 117 may calculate the image feature amount 1123 from the image region determined to be registered, or may calculate the image feature amount 1143 of a page of document data containing the image region determined to be registered as in S210. Then, the data management program 122 may store, in addition to the calculated image feature amount 1123, information on the query image, and information on document data containing the query image, and the like in the image data DB 112, the document data DB 113, and the page data DB 114.

On this occasion, a high reliability is stored in the reliability 1128 relating to the query image to be stored in the image data DB 112. This is because the query image is selected by the user, and is thus an image proper for the search.

The information on an image high in reliability is accumulated as an image of comparison destination in the image data DB 112 each time the search processing is carried out by storing the information on the query image in the image data DB 112. As a result, the document search device 100 according to this embodiment can increase the accuracy of the search each time the search processing is carried out.

The document search device 100 according to this embodiment searches images of comparison destination for images that are the same as or similar to the query image contained in the document data (page) of the comparison source, and can thus extract highly accurately document data of comparison destination different in layout but similar in image of each page.

The document search device 100 according to this embodiment extracts an image (second image region), from document data of comparison source, that is the same as or similar to an image of comparison destination. As a result, an image proper for the search can be extracted from the document data.

Moreover, each page of document data of comparison source is acquired as a layout image, and the processing in S207 of FIG. 8 and S307 of FIG. 11 is applied to an image of comparison source on which one layout image is pasted. Then, an image (third image region) similar to an image of comparison destination is extracted. Therefore, document data similar in texts to the document data of comparison source containing texts can be extracted from document data of comparison destination.

This indicates that even when the document search device 100 according to this embodiment searches for document data containing texts from an image, the document search device 100 acquires the document data as a layout image, and can carry out highly accurate search. Moreover, the document search device 100 can also search for document data containing a language other than Japanese.

Moreover, the unit of images can be extracted in a unified way from document data from which a document structure cannot be acquired or document data in which the units of images are not unified, thereby preventing a miss in search.

Further, according to this embodiment, which of the image regions extracted by means of the plurality of methods is proper for the search is comprehensively determined in accordance with the overlap ratio of the respective image regions (or difference ratio) and the reliabilities corresponding to the respective methods. Therefore, the document search device 100 according to this embodiment can accumulate an image more proper for the search as an image of comparison destination each time the registration processing and the search processing are carried out.

As described above, the document search device 100 according to this embodiment can extract document data containing the same or similar image independently of language, texts, and layout information. In other words, document data containing the same or similar topic for the user can be extracted highly accurately.

Further, the document search device 100 according to this embodiment accumulates a query image extracted from document data each time the search processing is carried out, and can thus accumulate information relating to image high in reliability, thereby enabling search high in accuracy. Moreover, the document search device 100 enables the user to select a query image, and can thus accumulate images more proper for search for the user.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image processing method for use by an image processing system including a processor executing a program stored in a memory and a storage unit for holding a plurality of images, the image processing method comprising:
   an acquisition step of acquiring, by the processor, data containing an image;
   a first extraction step of extracting, by the processor, a first image region from the acquired data in accordance with a type of software used for generating the acquired data;
   a second extraction step of extracting, by the processor, a second image region that is the same as or similar to each of the plurality of images held in the storage unit from the acquired data, wherein the image similarity is based upon comparing the acquired data and each of the plurality of images held in the storage unit to calculate a characteristic of compared image features which is compared to a predetermined threshold;
   a third extraction step of extracting, by the processor, a third image region that is the same as or similar to each of the plurality of images held in the storage unit from the acquired data by comparing an image feature amount of the acquired data and an image feature amount of each of the plurality of images held in the storage unit in accordance with the characteristic of the compared image features relative to a predetermined threshold; and
   a step of identifying, by the processor, an image in the acquired data to be stored in the storage unit based on the first image region, the second image region and the third image region, and reliabilities set to the first extraction step, the second extraction step and the third extraction step in accordance with another predetermined threshold,
   wherein the step of identifying the image in the acquired data to be stored in the storage unit comprises:
   calculating, by the processor, a ratio representing mutual overlaps among the first image region, the second image region and the third image region; and
   identifying, by the processor, the image to be stored in the storage unit out of the first image region, the second image region, and the third image region based on the calculated ratio representing the mutual overlaps, and the reliabilities set to the first extraction step, the second extraction step and the third extraction step.

2. The image processing method according to claim 1, wherein the first extraction step comprises:
   determining, by the processor, whether the image contained in the acquired data can be extracted from the acquired data based on the type of software used for generating the acquired data; and
   extracting, by the processor, the first image region from the acquired data in a case where it is determined that the image contained in the acquired data can be extracted from the acquired data.

3. The image processing method according to claim 1, wherein the second extraction step comprises:
   acquiring, by the processor, a first image showing a content of the acquired data;
   generating, by the processor, a plurality of second images from the first image;
   comparing, by the processor, each of the plurality of second images and each of the plurality of images held in the storage unit with each other; and
   extracting, by the processor, the second image region by extracting a second image that is the same as or similar to each of the plurality of images held in the storage unit as a result of the comparing in accordance with the characteristic of the compared image features relative to the predetermined threshold.

4. The image processing method according to claim 3, wherein the third extraction step comprises:
   calculating, by the processor, an image feature amount of the first image;
   comparing, by the processor, the image feature amount of the first image and the image feature amount of each of the plurality of images held in the storage unit with each other; and
   extracting, by the processor, the third image region by extracting the first image in a case where it is determined that the first image and each of the plurality of images held in the storage unit are the same as or similar to each other as a result of the comparing in accordance with the characteristic of the compared image features relative to the predetermined threshold.

5. The image processing method according to claim 1, wherein:
   the image processing system further comprises:
      a display unit for displaying the first image region, the second image region, and the third image region to a user; and
      an input unit for enabling the user to select any image region out of the first image region, the second image region, and the third image region, which are displayed on the display unit;
   the storage unit further holds a reliability allocated to each of the plurality of held images, and a plurality of pieces of data each containing each of the plurality of held images; and
   the image processing method comprises:
   enabling, by the processor, the user to select an image region out of the first image region, the second image region, and the third image region by means of the display unit and the input unit;
   searching, by the processor, the plurality of images held in the storage unit for an image that is the same as or similar to the selected image region in accordance with the characteristic of the compared image features relative to the predetermined threshold;
   extracting, by the processor, a piece of data containing an image found in the searching from the plurality of pieces of data; and
   increasing, by the processor, a reliability allocated to the image found in the searching.

6. An image processing system, comprising:
   a processor executing a program stored in a memory; and
   a storage unit for holding a plurality of images,
   the processor being configured to:
   acquire data containing an image;
   extract, in a first extraction step, a first image region from the acquired data in accordance with a type of software used for generating the acquired data;
   extract, in a second extraction step, a second image region that is the same as or similar to each of the plurality of images held in the storage unit from the acquired data, wherein the image similarity is based upon comparing the acquired data and each of the plurality of images held in the storage unit to calculate a characteristic of compared image features which is compared to a predetermined threshold;

extract, in a third extraction step, a third image region that is the same as or similar to each of the plurality of images held in the storage unit from the acquired data by comparing an image feature amount of the acquired data and an image feature amount of each of the plurality of images held in the storage unit in accordance with the characteristic of the compared image features relative to the predetermined threshold;

identify an image in the acquired data to be stored in the storage unit based on the first image region, the second image region and the third image region, and reliabilities set to the first extraction step, the second extraction step and the third extraction step in accordance with another predetermined threshold;

calculate a ratio representing mutual overlaps among the first image region, the second image region and the third image region; and identify the image in the acquired data to be stored in the storage unit out of the first image region, the second image region and the third image region based on the calculated ratio representing the mutual overlaps, and the reliabilities set to the first extraction step, the second extraction step and the third extraction step.

7. The image processing system according to claim 6, wherein the processor is further configured to:

determine whether the image can be extracted from the acquired data based on the type of software used for generating the acquired data; and extract the first image region from the acquired data in a case where it is determined that the image can be extracted from the acquired data.

8. The image processing system according to claim 6, wherein the processor is further configured to:

acquire a first image showing a content of the acquired data;

generate a plurality of second images from the first image;

compare each of the plurality of second images and each of the plurality of images held in the storage unit with each other; and extract the second image region by extracting a second image that is the same as or similar to each of the plurality of images held in the storage unit as a result of the comparison in accordance with the characteristic of the compared image features relative to the predetermined threshold.

9. The image processing system according to claim 8, wherein the processor is further configured to:

calculate an image feature amount of the first image;

compare the image feature amount of the first image and the image feature amount of each of the plurality of images held in the storage unit with each other; and extract the third image region by extracting the first image in a case where it is determined that the first image and each of the plurality of images held in the storage unit are the same as or similar to each other as a result of the comparison in accordance with the characteristic of the compared image features relative to the predetermined threshold.

10. The image processing system according to claim 6, wherein:

the image processing system further comprises:

a display unit for displaying the first image region, the second image region, and the third image region to a user; and an input unit for enabling the user to select any image region out of the first image region, the second image region and the third image region displayed on the display unit;

the storage unit further holds a reliability allocated to each of the plurality of held images, and a plurality of pieces of data each containing each of the plurality of held images; and the processor is further configured to:

enable the user to select an image region out of the first image region, the second image region and the third image region by means of the display unit and the input unit;

search the plurality images held in the storage unit for an image that is the same as or similar to the selected image region in accordance with the characteristic of the compared image features relative to the predetermined threshold;

extract a piece of data containing an image found in the search from the plurality of pieces of data; and increase a reliability allocated to the image found in the search.

* * * * *